United States Patent

[11] 3,579,869

| | | |
|---|---|---|
| [72] | Inventor | Terry L. Hewitt<br>Schenectady, N.Y. |
| [21] | Appl. No. | 854,417 |
| [22] | Filed | Sept. 2, 1969 |
| [45] | Patented | May 25, 1971 |
| [73] | Assignee | General Electric Company |

[54] AUTOMATIC ANSWER CONFIRMATION SYSTEM
7 Claims, 5 Drawing Figs.

[52] U.S. Cl. ..................................................... 35/48
[51] Int. Cl. ..................................................... G09b 7/00
[50] Field of Search ........................................... 35/9, 48, 48 (B)

[56] References Cited
UNITED STATES PATENTS

| | | | |
|---|---|---|---|
| 3,487,561 | 1/1970 | Azure, Jr. et al. ............. | 35/48(B) |
| 3,500,559 | 3/1970 | Jones et al. .................... | 35/48 |

Primary Examiner—Wm. H. Grieb
Attorneys—Richard R. Brainard, Paul A. Frank, John J. Kissane, Frank L. Neuhauser, Oscar B. Waddell and Joseph B. Forman ABSTRACT: An automatic answer confirmation system employable with a student response system is described wherein the problem and test designator numerals are logically combined to extract a single correct answer for the multiple choice question being answered. To effect this result, the problem and test designator numerals are encoded into the answer confirmation system as binary coded decimal digits and the digits are summed in two exclusive-OR stages to produce a composite digital number related to the problem being answered. The composite number then is entered into an answer select matrix for extraction of the correct answer for the problem and the correct answer is compared with the student selected choice to automatically determine the correctness of the student's choice.

Inventor:
Terry L. Hewitt,
by John Kissane
His Attorney.

AUTOMATIC ANSWER CONFIRMATION SYSTEM

THE DISCLOSURE

This invention relates to an automatic answer confirmation system wherein designator digits in binary digital form are logically combined to extract a single correct response related to the designator digits. This correct response then is compared with separately entered operator selected information to evaluate the correctness of the operator introduced information.

In electronic student response systems, it is often desirable to correct each answer to a multiple choice question immediately upon presentation of the choice, e.g. to rapidly correct a test or to indicate the correctness of a choice to the student while the question is within easy recall. Automatic correction of student responses generally has required storage, e.g. in a computer memory, of answers for comparison with the submitted student responses. When a large number of student terminals are employed for testing purposes, the economic cost of computerized correction can be prohibitive notwithstanding the utilization of computer time sharing to reduce costs. Moreover, the required format of instruction and testing materials employed with computerized operation often limits the variety of materials available to the teacher to those materials specially prepared for computerized instruction. Thus, the ability of a teacher to present extracurricular material to the student is impaired unless the additional material is programmed into the computer by an individual having the required skill.

It is therefore an object of this invention to provide an automatic answer confirmation system wherein the correctness of a submitted choice is immediately determined from the problem designators without the necessity for computer storage facilities.

It is also an object of this invention to provide an automatic answer confirmation system wherein diverse tests can be answered simultaneously by different students.

It is also an object of this invention to provide an inexpensive, noncomputerized student answer confirmation system wherein an irregular sequence of answers to consecutively numbered problems are automatically produced to determine the correctness of the students' choices.

It is a still further object of this invention to provide an automatic answer confirmation system not requiring a special skill for preparation of tests.

These and other objects of this invention are achieved in an automatic answer confirmation system having means for encoding the problem and test designators of a multiple choice test into the confirmation system as coded logic numbers containing a plurality of binary digits and means for reducing the number of digits of the coded logic numbers to produce an answer sequence logic number related to the designators. In order to produce an irregular answer sequence for successive problem designators, the logic means employed to reduce the number of digits of the problem designator logic numbers should provide an equal probability for one of two conditions in each digit of the answer select logic number. The answer select logic number then is applied to logic circuitry for conversion of the answer select logic number to the correct answer corresponding to the problem identified by the designators and the correct answer is retained within the automatic answer confirmation system until a choice is made by the student whereupon the correct answer is correlated with the selected choice to provide an indication of the correctness of the choice.

The novel features believed characteristic of the invention are set forth in the appended claims. The invention itself, together with further objects and advantages thereof may best be understood by reference to the following description, taken in connection with the accompanying drawings, in which:

Figure 1:
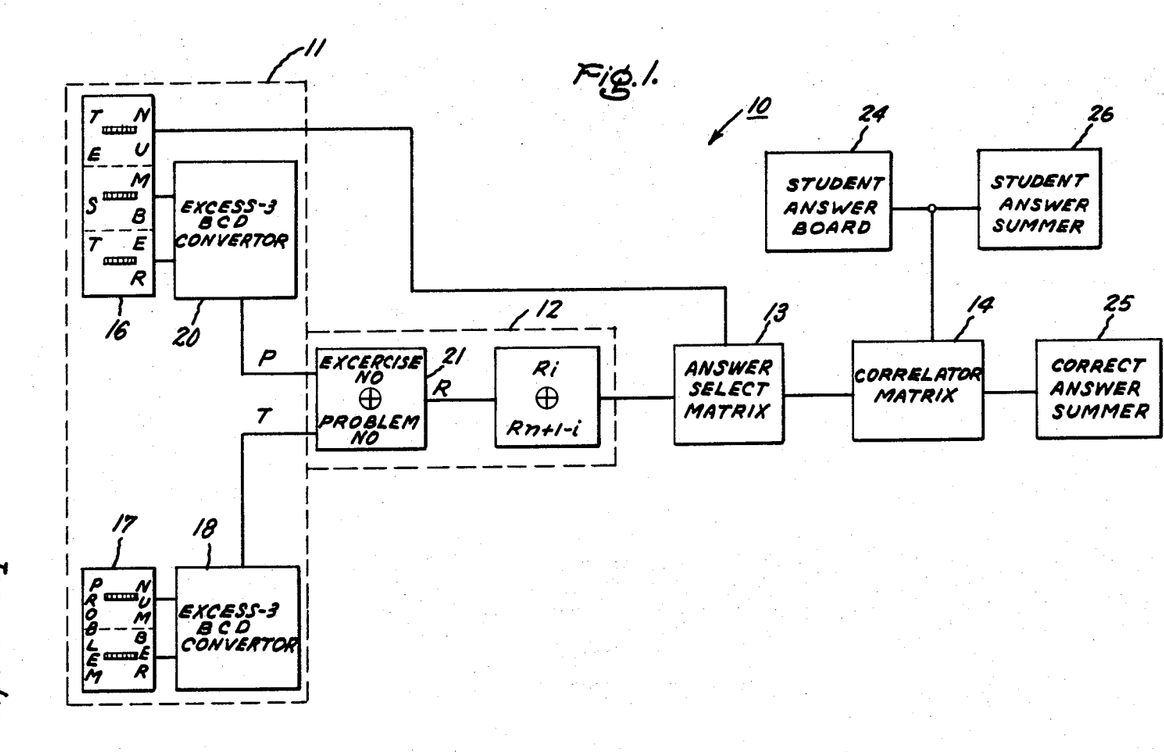
FIG. 1 is a block diagram of an automatic answer confirmation system in accordance with this invention.

An automatic answer confirmation system 10 in accordance with this invention is illustrated in simplified form in FIG. 1 and generally includes question designator input circuitry 11 specifically identifying the problem and test being answered as binary digital numbers, logic summing circuitry 12 operative upon the binary digital numbers to produce an answer select logic number corresponding to the problem being answered and an answer select matrix 13 for determining the correct answer to the problem from the answer select logic number. The correct answer as determined from the answer select matrix then is compared with the student selected answer in correlator matrix 14 to provide an output signal indicative of the correctness of the response.

Question designator input circuitry 11 suitably may include two thumb wheel switches 16 and 17 wherein three decimal digits indicative of the test number being performed and two decimal digits indicative of the problem number being answered, respectively, are set by the student prior to answering the designated problem. Each of the digits of the problem number are converted to four digit excess-3 binary coded numbers within decimal to excess-3 binary digital converter 18 while each of any two digits of the exercise number, e.g. the units and tens digits, are converted to four digit excess-3 binary coded numbers within a second excess-3 binary digital converter 20. Although the excess-3 binary coded system is disclosed in the automatic answer confirmation system of this invention because of the commercial availability of electronic components, e.g. decimal to excess-3 binary converters, based upon this system, a nonsequential four digit coding system may be preferred in order to increase the randomness of the output sequence. The chosen binary code however should be characterized by an equal number of logic zeros and logic ones in each binary digit column for the decimal digits between zero and nine to maximize the probability for the occurrence of any possible digit combination in a binary coded number obtained by combining the problem and test numbers.

After conversion to the excess-3 binary coded system, the eight binary digit test number (T) and the eight binary digit problem number (P) are applied as inputs to exclusive-OR circuit 21 wherein the 16 digits are logically summed to produce an eight digit resultant number (R) according to the formula:

$$R_i = T_i \oplus P_i$$

for $i=1,...,n$ where $n$ is the number of binary coded digits produced by each BCD converter 18 and 20 and the exclusive-OR operation $\oplus$ is defined in conventional fashion by the logic operation $A \oplus B = A\bar{B} + \bar{A}B$. Suitably, the excess-3 binary coded representation of the problem number units digit is exclusive-OR summed with the excess-3 binary coded representation of the test number units digit while the excess-3 binary coded representation of the problem number tens digit is exclusive-OR summed with the excess-3 binary coded representation of the tens digit of the test number. Any permutation however may be employed is combining the problem number and test number in exclusive-OR circuit 21.

The eight digit resultant number output from exclusive-OR circuit 21 then is applied to a second exclusive-OR circuit 22 wherein the binary digits forming the resultant number are folded upon themselves and logically summed to produce a four digit answer select number in accordance with the formula:

$$S_i = R_i \oplus R_{n+1-i}$$

for $i=1,...n/2$ where $n$ is the number of binary coded digits produced by each BCD converter 18 and 20. Because exclusive-OR circuits 21 and 22 are operative upon the input digits in a logic operation which provides an equal probability for the occurrence of a logic zero or logic one as a resultant output, the symmetry initially achieved by encoding the decimal digits of the problem number and test numbers as excess-3 binary coded digits is maintained throughout the logic summing circuitry thereby providing an equal probability for a logic zero or a logic one to occur in each digit of the answer select number.

In general, the logic operations employed to reduce the number of binary coded digits from 16 to a workable number of four can vary, e.g. the excess-3 binary number corresponding to the units decimal digit of the problem number could be summed with the excess-3 binary number corresponding to the tens decimal digit of the test number and the excess-3 binary number corresponding to the tens decimal digit of the problem number could be summed with the excess-3 binary number corresponding to the units decimal digit of the test number in exclusive-OR circuit 21 without affecting the operation of the automatic answer confirmation system of this invention. Thus the only requirement of logic summing circuitry 12 is the generation of an irregular sequence of answer select numbers for consecutive problem numbers with each answer select number having an equal probability for occurring. To effect this result, each step of the logic summing circuitry should provide an equal probability for a logic one or logic zero in each digit of the answer select number. For a fixed exercise number and a fixed problem number however, the answer select number output from the logic summing circuitry always is constant for given circuit connections.

The four digit answer select number obtained from logic summing circuitry 12 is fed to answer select matrix 13 along with a signal corresponding to the previously unused third decimal digit of the test number, e.g. the hundreds digit as set by thumbwheel switch 16, to produce a single answer for the problem number and test number being worked. Answer select matrix 13 suitably may include 16 diode quads each switched by a distinct answer sequence logic number to energize four lines corresponding to the correct answer for tests having 5, 4, 3, or 2 choices per problem. The hundreds digit of the test number is coded to the number of choices per problem and selects the single correct answer for the problem being worked.

The correct answer as determined by the answer select matrix then is fed to correlator matrix 14 along with the student choice as indicated by the depression of a pushbutton corresponding to the selected answer in student answer board 24. When the answer selected by the student is identical to the answer obtained by the logical combination of the problem number and test number within the automatic answer confirmation system, an output signal is produced from correlator matrix 14 and each output signal is totaled by correct answer summer 25, e.g. a digital counter. Each answer given by the student also can be totaled by a second answer summer 26 energized by a depression of any answer pushbutton in student answer board 24.

Figure 2A:
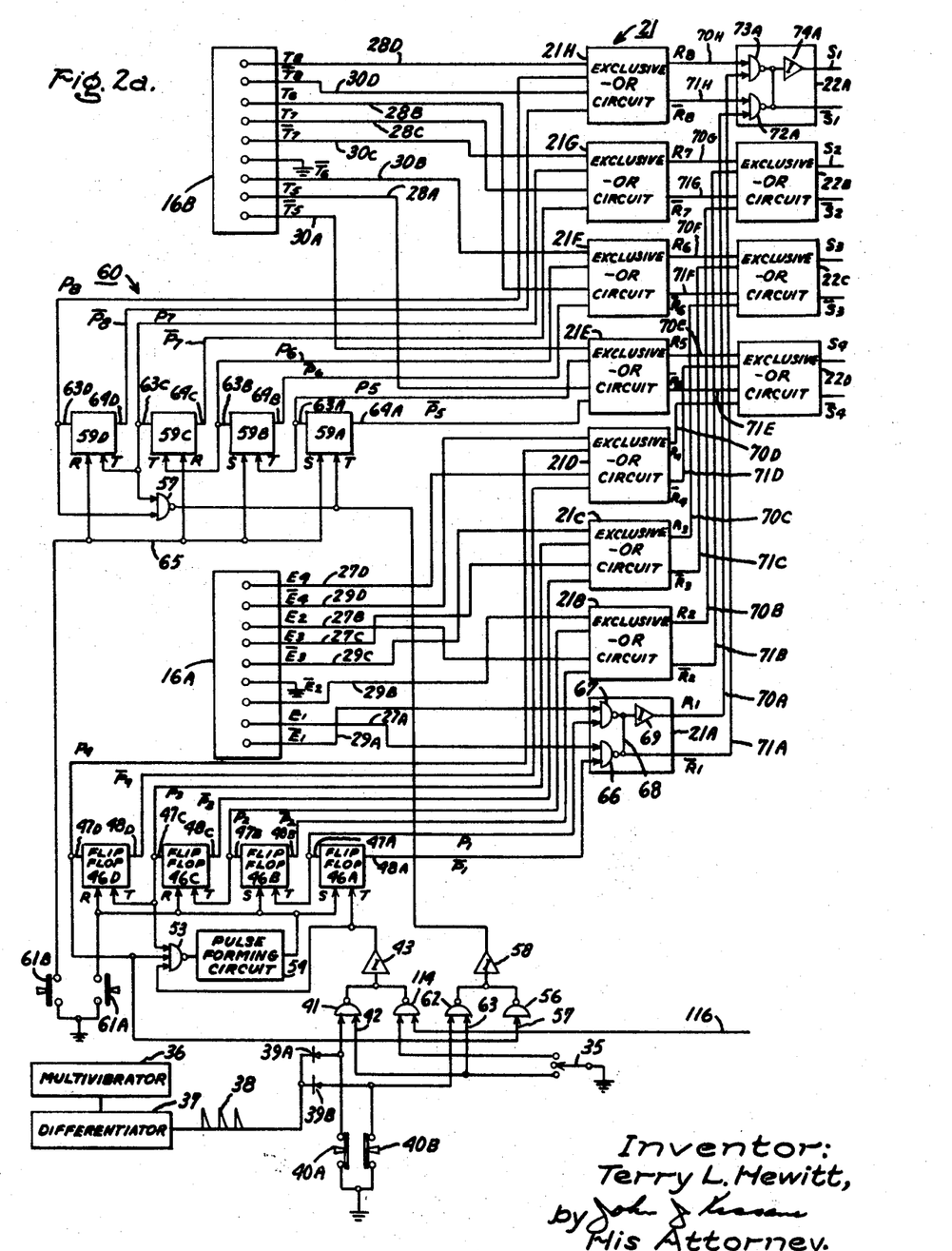
FIGS. 2a, 2b and 2c are selectively exposed block diagrams illustrating suitable circuitry for the automatic answer select system of FIG. 1.
Figure 2B:
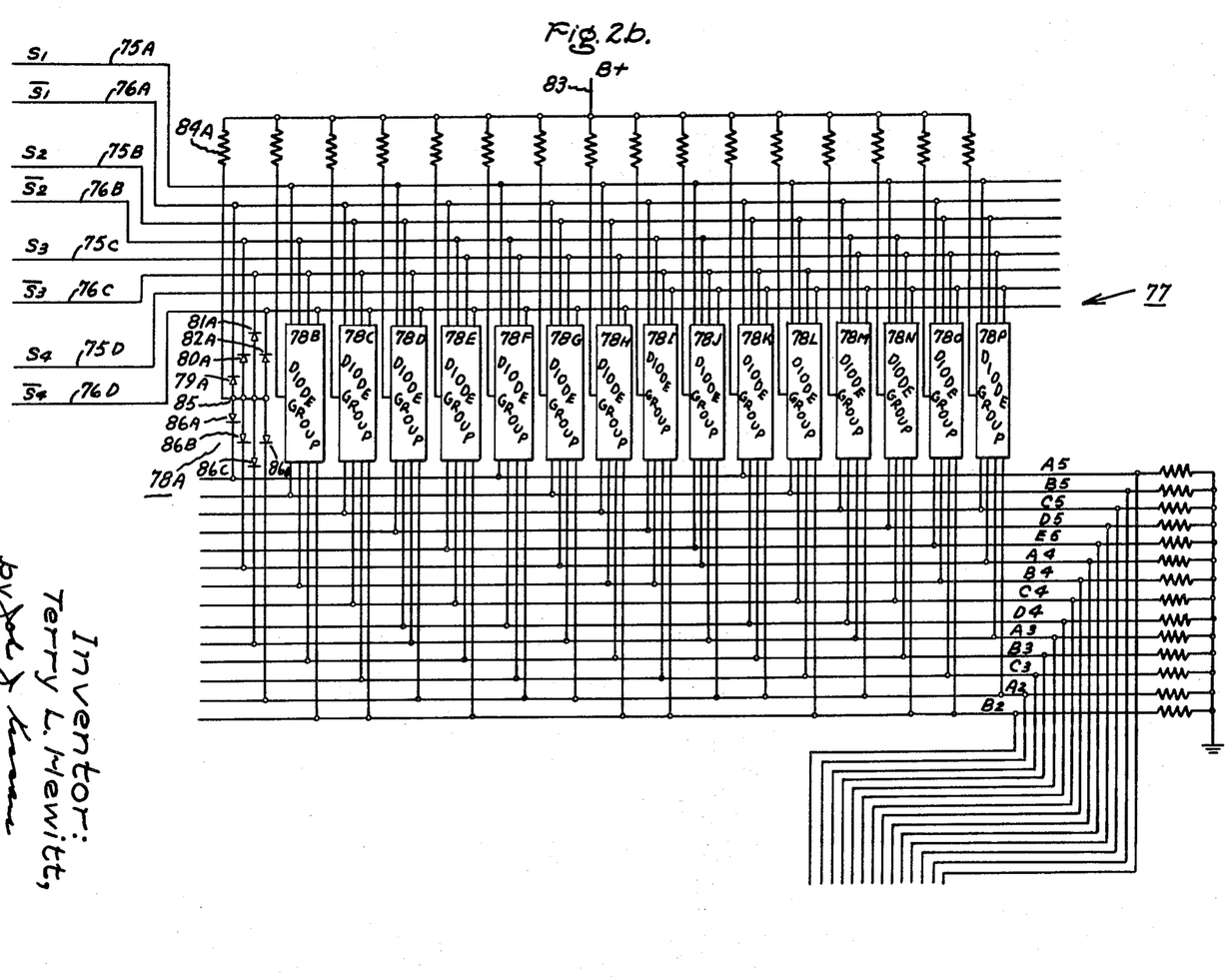
Figure 2C:
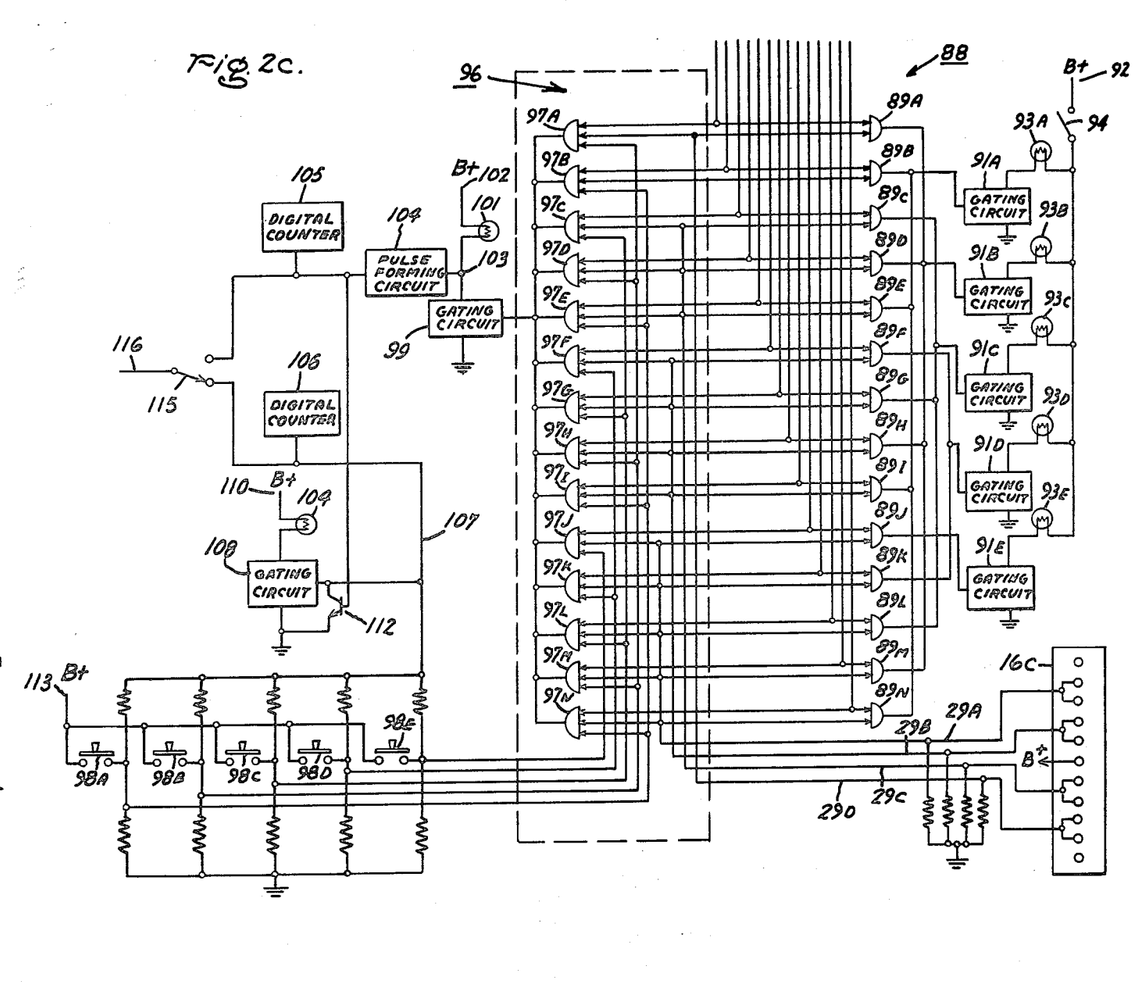

A specific embodiment of an automatic answer confirmation system in accordance with this invention is illustrated more particularly in FIG. 2 wherein circuit configurations corresponding to those of FIG. 1 are indicated by similar reference numerals. The test number is manually encoded into the answer confirmation system by three conventional thumbwheel switches 16A, 16B and 16C, i.e. one thumbwheel for each digit of the three decimal digit number identifying the test being taken. Thumbwheel switches 16A and 16B corresponding to the units and tens digits of the test number convert the decimal digits to four digit excess-3 binary coded outputs on lines 27A—27D and lines 28A—28D, respectively, while potentials corresponding to the inverse, or bar, of each digit of the units and tens excess-3 binary coded digits are provided by thumbwheel switches 16A and 16B on lines 29A-—29D and 30A—30D, respectively.

Thumbwheel switches to produce the excess-3 binary coded digits and the bars of each digit are commercially available from Chicago Dynamic Industries, Inc., Chicago, Ill., under the catalogue designation TTB-P code type TS175-610 with compliment. These switches (not shown) typically comprise a circular substrate of insulating material having a serrated edge for rotation of the substrate. One face of the substrate is provided with a plurality of arcuately shaped conductive segments intermittently contacted by eight wiper arms as the substrate is rotated. Each of the arcuate segments are connected to ground potential and as the substrate forming, for example, thumbwheel switch 16A is manually rotated, lines 27A—27D representing the $2^0$, $2^1$, $2^2$, and $2^3$ digits, respectively, of the test number units digit are intermittently grounded through the wiper arm and arcuate segments associated with each line. Similarly, the inverse, or bar, of each excess-3 binary coded digit is produced on lines 29A—29D by grounding or open circuiting each line through the wiper arm and arcuate segment associated therewith.

Desirably, the hundreds digit of the test number is coded relative to the number of choices per problem in the test being taken, e.g. tests numbered in the 7 and 8 hundred series have 5 answers per problem while tests in the 600 and 500 series, 400 and 300 series, and 200 and 100 series have 4, 3, and 2 choices per problem, respectively. The hundreds digit of the test number as set by thumbwheel switch 16C therefore need energize only one of four lines 29A to 29D dependent upon the number of choices per problem.

Because the problem number being answered during a test is changed frequently while the test number remains constant, means are provided to permit automatic advancement of the problem number with switch 35 serving to control the method of advancement of the problem number dependent upon the positioning of the switch. With switch 35 contacting a central terminal (as shown), approximately one pulse per second is fed from multivibrator 36 to differentiator 37 to form positive going triggering pulses 38 which pulses are transmitted through diodes 39A and 39B to be shorted to ground by pushbuttons 40A and 40B controlling the advancement of the units and tens digits, respectively, of the problem number. When the problem number units digit is to be advanced, pushbutton 40A is depressed interrupting the circuit to ground and triggering pulses 38 are applied to NAND gate 41. Because the second input 42 to NAND gate 41 is open due to the center positioning of switch 35, the NAND gate is operative upon receipt of each triggering pulse from differentiator 37 to produce an output signal which output signal is fed to an invertor circuit 43 to generate a positive going signal therefrom. The output signal from invertor circuit 43 then is applied as a triggering input to units digit converter 45 for conversion of the digital triggering input signals to an excess-3 binary coded digital form.

Converter 45 generally comprises four flip-flop circuits 46A to 46D connected in conventional ripple-up counter fashion with each stage dividing the previous stage output by two (as will be more fully explained hereinafter). For the desired excess-3 binary coded digit converter, flip-flops 46A and 46B initially are in a set condition to provide a positive voltage signal, or logic one, on terminals 47A and 47B, respectively, while flip-flops 46C and 46D initially are in a reset condition to provide a zero voltage signal, or logic zero, on terminals 47C and 47D, respectively. The inverse of each digit forming the excess-3 binary coded digital representation of the problem number is provided on terminals 48A—48D of the flip-flop generating the digit.

Figure 3:
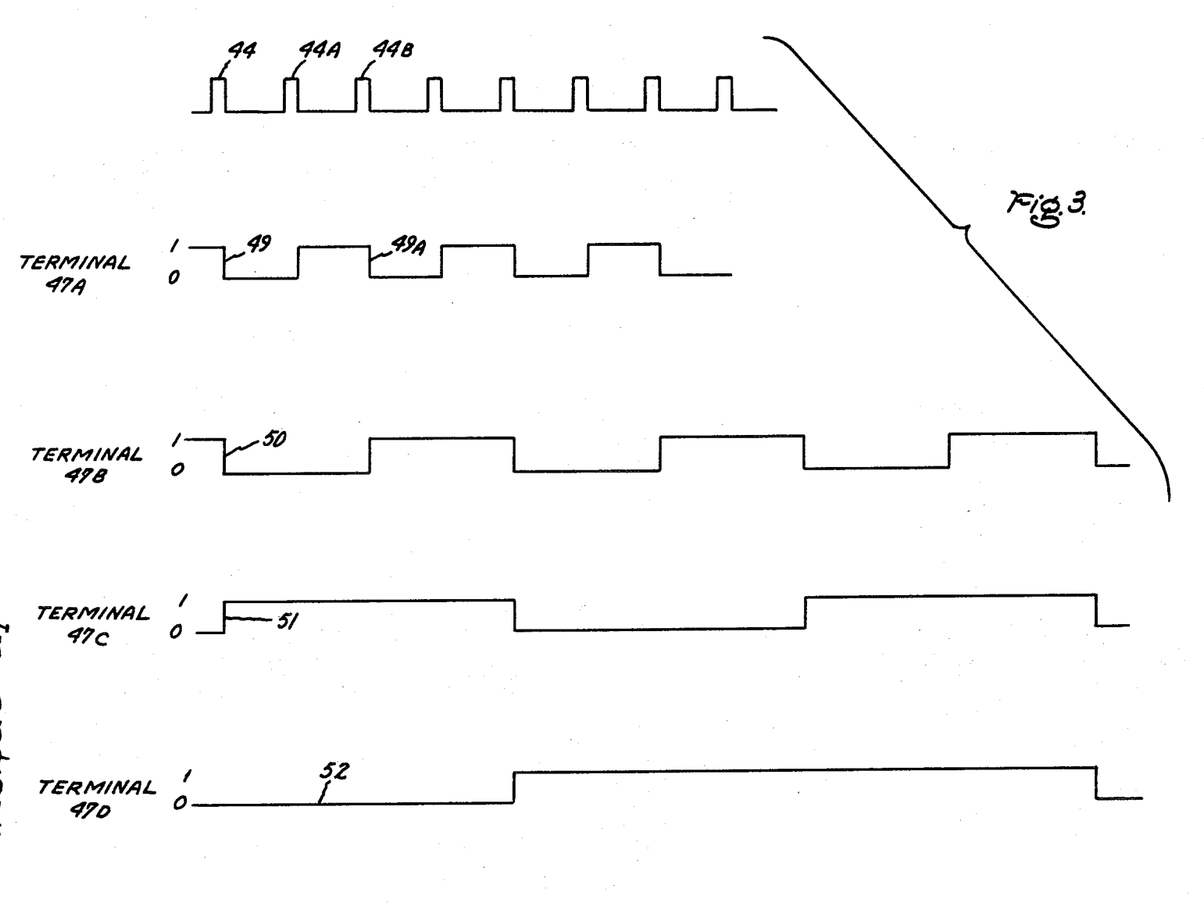
FIG. 3 is a waveform illustrating the operative periods of each flip-flop circuit of the ripple-up counter employed as one means to encode problem designators in accordance with this invention.

The negative transition of initial pulse 44, illustrated in FIG. 3, from invertor circuit 43 applied to flip-flop 46A alters the state of flip-flop 46A to produce a negative going output 49, i.e. a logic zero, on terminal 47A with output terminal 48A of flip-flop 46A reverting to a positive potential of, for example, +5 volts, i.e. a logic one. The negative going transition of output 49 on terminal 47A alters the operative mode of flip-flop 46B thereby producing a negative going output 50 from terminal 47B and the negative going transition of output 50 is applied to flip-flop 46C to produce a positive going output 51, i.e. a logic one, on terminal 47C. Because the operative mode of each flip-flop is altered only upon transition of the prior flip-flop stage from a logic one to a logic zero, negative pulse 52 corresponding to a logic zero continues as the output signal from terminal 47D of flip-flop 46D. The second pulse 44A from invertor circuit 43 alters the operative mode of flip-flop 46A to return flip-flop 46A to an initial condition with a logic one on terminal 47A. However since flip-flop 46B is triggered only by the advent of a negative going transition in the preceeding stage, flip-flop 46B remains unchanged until flip-flop 46A has again been switched, e.g. by pulse 44B, whereupon the negative going transition to output 49A on terminal 47A alters the mode of flip-flop 46B to produce a transition on terminal 47B. Flip-flops 46A—46D continue in a ripple-up fashion until the 1100 condition i.e. flip-flop terminals 47C and 47D having positive voltages and flip-flop terminals 47A and 47B at zero volts, whereupon the positive going outputs on terminals 47C and 47D are applied simultaneously to NAND gate 53. The next positive going excursion of the triggering signal from invertor circuit 43 completes the energization of all inputs to NAND gate 53 and a negative going output signal is generated from NAND gate 53 to set pulse forming circuit 54. Upon termination of the output signal from NAND gate 53 at the trailing edge of the triggering signal from invertor circuit 43, a negative going signal is produced by pulse forming circuit 54 to reset flip-flops 46C and 46D and set flip-flops 46A and 46B returning converter 45 to the initial excess-3 binary coded digit 0011 (equivalent to decimal zero). The output signal from flip-flop 46D also is fed through NAND gate 56 and invertor circuit 58 to trigger a first flip-flop 59A in tens decimal digit converter 60.

Converter 60 is identical to converter 45 and comprises four flip-flop circuits 59A—59D connected as a ripple-up counter to produce a representation of the tens decimal digit of the problem number in excess-3 binary digital form. As with the units digit of the problem number, the student can independently advance the tens decimal digit identifying the problem by depressing pushbutton 40B to apply pulses 38 from differentiator 37 to NAND gate 62. Because the second input lead 63 to NAND gate 62 is open with switch 35 in a center position, an output signal is generated from NAND gate 62 upon the application of each pulse from differentiator 37 and the output signals from NAND gate 62 are fed through invertor circuit 58 to produce a triggering pulse for flip-flop 59A of tens converter 60. As previously explained with reference to units converter 45, each flip-flop of the tens converter generates signals on terminals 63A—63D corresponding to an excess-3 binary coded digital representation of the tens decimal digit while the inverse, or bar, of each excess-3 binary coded digit is generated on terminals 64A—64D of the flip-flops. When the tens converter reaches a 1100 condition, both inputs to NAND gate 57 are energized simultaneously with positive potentials from terminals 63C and 63D and an output signal is generated from the NAND gate inhibiting further triggering of flip-flop 59 by invertor circuit 58. Pushbuttons 61A and 61B also are provided between ground and the set(S) and reset(R) terminals of the flip-flop circuits forming converters 45 and 60, respectively, to manually reset the converters to an original condition when desired.

After conversion of the tens and units digits of the problem number to excess-3 binary digital coded form, the excess-3 binary digits corresponding to the problem number are combined with the excess-3 binary digits corresponding to the test number in exclusive-OR circuit 21 which halves the total number of binary digits corresponding to a particular problem in a selected test.

Thus for a problem number represented in digital form by the formula $$P_{\overline{i=8}} P_7 P_6 P_5 P_4 P_3 P_2 P_1$$

(wherein $P_4$ to $P_1$ is the excess-3 binary coded number corresponding to the units decimal digit of the problem number and $P_8$ to $P_5$ is the excess-3 binary coded number corresponding to the tens digit of the problem number) and for a test number represented by the binary digit $$T_{n=8} T_7 ... T_1$$

(wherein $T_8$ to $T_5$ is the excess-3 binary coded number corresponding to the tens decimal digit of the test number and $T_4$ to $T_1$ is the excess-3 binary coded number corresponding to the units decimal digit of the test number), exclusive-OR circuit 21 produces a resultant number, R, composed of eight binary digits each equal to $T_i \oplus P_i$ wherein $i$ is the subscript of the excess-3 binary coded digits being added.

To effect an exclusive-OR summation of the problem number and test number digits, the $T_1$ digit of the test number units decimal digit on line 27A of thumb switch 16A is applied to a first NAND gate 66 in exclusive-OR circuit 21A along with $\overline{P}_1$ from terminal 48A (corresponding to the inverse, or bar, of the $i=1$ digit of the units decimal digit of the problem number) while $\overline{T}_1$ on line 29A corresponding to the inverse, or bar, of the $i=1$ digit of the test number units digit and $P_1$ on terminal 47A corresponding to the $i=1$ digit of the problem number units digit are applied as dual inputs to a second NAND gate 67 in exclusive-OR circuit 21A. When both inputs to either NAND gate 66 or NAND gate 67 are true, e.g., a logic one, or +5 volts from flip-flop 46A and a logic one, or open circuit from thumbwheel switch 16A, the voltage at junction 68 interconnecting the common outputs of NAND gates 66 and 67 goes low (or a logic 0). The output signal at junction 68 then is fed to an inverter circuit 69 to produce a signal corresponding to the exclusive-OR output $R_1$ on line 70A while the inverse, or bar, of the exclusive-OR output $\overline{R}_1$ is obtained on line 71A connected to the common outputs of NAND gates 66 and 67. Similarly, the $P_2$ digit of the problem units digit on terminal 47B and the $T_2$ digit of the test number units digit on line 27B are added along with the bar of these digits on terminals 48B and line 29B, respectively, in exclusive-OR circuit 21B to produce an exclusive-OR resultant, $R_2$, on line 70B and the inverse of the result, $\overline{R}_2$, on line 71B while the $P_3$ digit of the problem number and the bar of this digit on terminals 47C and 48C, respectively, of flip-flop 46C are applied to exclusive-OR circuit 21C along with the $T_3$ and $\overline{T}_3$ outputs on lines 27C and 29C, respectively, to provide an exclusive-OR resultant $R_3$ on line 70C along with the inverse of the resultant, $\overline{R}_3$, on line 71C. Similarly, the $P_4$ digit of the problem number is combined with the $T_4$ digit of the test number in exclusive-OR circuit 21D to produce an exclusive-OR resultant on line 70D and the inverse of the resultant on line 71D while the excess-3 binary coded tens digits of the problem number are combined with the corresponding excess-3 binary coded tens digits of the test number in exclusive-OR circuits 21E—21H to produce the exclusive-OR resultants $R_5$-–$R_8$ on lines 70E—70H along with the inverse of the outputs, i.e. $\overline{R}_5$–$\overline{R}_8$, on lines 71E—71H.

Because the exclusive-OR circuit produces a logic operation in accordance with the following table:

TABLE I

| $T_i$ | $P_i$ | $T_i \oplus P_i$ |
|---|---|---|
| 0 | 0 | 0 |
| 0 | 1 | 1 |
| 1 | 0 | 1 |
| 1 | 1 | 0 | each possible combination of the test number and problem number digits provides an equal probability for a logic one or a logic zero in the exclusive-OR output. Thus the 16 excess-3 binary coded digits corresponding to the problem number and test number are reduced in exclusive-OR circuits 21A—21H to 8 digits without a reduction in probability for the occurrence of a logic one or a logic zero in the summed signals. Although the specific implementation disclosed herein utilizes the exclusive-OR logic operation, combination of the problem number and test number also could be effected by circuitry producing the inverse of the exclusive-OR logic operation, i.e. a logic operation defined by the formula $$AB + \overline{A}\overline{B} = \overline{A \oplus B}$$

The eight binary digits on terminals 70A—70H forming the output signal from exclusive-OR circuit 21 then are combined in a second exclusive-OR circuit 22 to reduce the number of total digits representing the problem number and test number to four digits. To effectuate this result, the exclusive-OR output from circuit 21A on line 70A is combined in a first NAND gate 72A of exclusive-OR circuit 22A (identical to exclusive-OR circuit 21A) with the bar of the exclusive-OR output from circuit 21H on line 71H while the bar of the exclusive-OR output from circuit 21A on line 71A is combined in a second NAND gate 73A of exclusive-OR circuit 22A with the exclusive-OR output from circuit 21H on line 70H. The outputs from NAND gates 72A and 73A are connected and fed to invertor circuit 74A to produce the exclusive-OR sum, $S_1$, of the exclusive-OR outputs from exclusive-OR circuits 21A and 21H on line 75A while the input to inverter circuit 74A is connected to line 76A to provide the inverse, or bar, of the exclusive-OR sum $\overline{S}_1$ thereon. In a similar manner, the exclusive-OR output from circuit 21B on line 70B, the bar of the exclusive-OR output on line 71B, the exclusive-OR output from circuit 21G on line 70G and the bar of the exclusive-OR output on line 71B are combined in exclusive-OR circuit 22B to produce an exclusive-OR sum, $S_2$, on line 75B along with the inverse of the exclusive-OR sum, $\overline{S}_2$, on line 76B while the outputs from exclusive-OR circuit 21C are combined with the outputs from exclusive-OR circuit 21F in exclusive-OR circuit 22C to produce an exclusive-OR sum, $S_3$, on line 75C along with the inverse of the exclusive-OR sum on line 76C and the outputs from exclusive-OR circuit 21D are combined with the outputs from exclusive-OR circuit 21E in exclusive-OR circuit 22D to produce the exclusive-OR sum, $S_4$, on line 75D and inverse, $\overline{S}_4$, of the exclusive-OR sum on line 76D.

Thus the 16 excess-3 binary coded digits, i.e. the eight excess-3 binary coded digits initially identifying the two decimal digit problem number and the eight excess-3 binary coded digits identifying two decimal digits of the test being taken, are reduced in exclusive-OR circuits 21 and 22 to four digits, i.e. $S_1$ to $S_4$, thereby forming an answer select logic number by logic operations which assure an irregular answer select logic number sequence for successive problem numbers of a given test with each possible combination of logic digits in the output having an equal probability of occurring. Although a given test number and problem number continuously produce the identical four binary digit answer select logic number because of the identical logic operations performed upon each input, the answer select logic number sequence from exclusive-OR circuit 22 follows no discernible fixed pattern.

The four digit answer select logic number from exclusive-OR circuit 22 provides 16 possible combinations for energization of leads 75A—75D and 76A—76D connected to the output terminals of exclusive-OR circuits 22A—22D. An answer is assigned to each one of the possible 16 combinations in a manner to provide an approximately equal division of answers with one suitable table for assignment of answers in the answer confirmation system being as follows:

TABLE II

| S | Number of choices/problem | | | |
|---|---|---|---|---|
|   | 5 | 4 | 3 | 2 |
| 0000 | A | A | A | A |
| 0001 | B | B | B | B |
| 0010 | C | C | B | B |
| 0011 | D | D | A | A |
| 0100 | E | C | B | B |
| 0101 | A | D | C | A |
| 0110 | B | A | A | A |
| 0111 | C | B | B | B |
| 1000 | D | B | C | B |
| 1001 | E | A | A | A |
| 1010 | A | D | B | A |
| 1011 | B | C | C | B |
| 1100 | C | D | A | A |
| 1101 | D | C | B | B |
| 1110 | E | B | C | B |
| 1111 | C | A | A | A |

In the above chart an extra answer, e.g. a C and an A answer for five and three choices per problem, respectively, necessarily is included in the chart thereby increasing the probability of a C for a 5 choice problem test or an A for a 3 choice problem test occurring in the test. Because exclusive-OR circuits 21 and 22 provide an irregular sequence of answer select logic numbers, there is no requirement that the assigned answers to each possible answer select logic number be arranged in a particular order.

The answer select logic number from exclusive-OR circuit 22 is fed to a problem answer matrix 77 which includes 16 individual diode groups 78A—78P connected to lines 75A—75D and 76A—76D from exclusive-OR circuit 22 to switch a single diode group with a given answer select logic number. Thus, for a first possible digital combination of 0000, the cathode of a first diode 79A in diode group 78A is connected to the $\overline{S}_1$ output on line 76A while the cathode of the second diode 80A in the group is connected to the $\overline{S}_2$ output on line 76B, the cathode of the third diode 81A of the group is connected to the $\overline{S}_3$ output on line 76C and the cathode of the fourth diode 82A of the group is connected to the $\overline{S}_4$ output on line 76D. The anodes of diodes 79A—82A are joined in conventional AND circuit fashion and connected to a positive voltage source 83 through a suitable current limiting resistor 84A. When the cathodes of diodes 79A—82A are simultaneously energized with positive voltages, i.e. a 0000 output from the exclusive-OR circuit 22, the voltage at anode junction 85 rises and is transmitted through four parallelly connected diodes 86A—86D to four lines designated $A_5$, $A_4$, $A_3$, and $A_2$, i.e. the correct answer lines for 5, 4, 3, and 2 choices per problem as set by Table II. Similarly, diode group 78B is connected to leads 75A, 76B, 76C and 76D which leads are simultaneously energized with positive voltages by a 0001 output from exclusive-OR circuit 22 while diode group 78C is connected to leads 76A, 75B, 76C and 76D simultaneously energized with positive voltages by a 0010 output from exclusive-OR circuit 22. In like fashion, each of the diode groups 78D—78P are connected to a different combination of leads 75 and 76 to be switched by a single distinct digital output from exclusive-OR circuit 22. Upon the switching of any one of the diode groups, four lines are energized corresponding to the answers assigned to the switching input signal by Table II. For example, diode group 78B switched by a 0001 output from exclusive-OR circuit 22 energizes lines $B_5$, $B_4$, $B_3$, and $B_2$ while diode group 78C switched by a 0010 output from exclusive-OR circuit 22 energizes lines $C_5$, $C_4$, and $B_2$. Similarly a single line of each of the four line groups $A_5$-$E_5$, $A_4$-$D_4$, $A_3$-$C_3$ and $A_2$-$B_2$ are energized by each of diode groups 78A—78P upon switching of the group in accordance with the assigned answers in Table II for the diode group switching signal. Thus, problem answering matrix 77 serves to energize four possible answer lines, i.e. a single answer line for tests having 5, 4, 3, or 2 choices per problem. When only tests having a fixed number of choices, e.g. 5 choices per problem are utilized exclusively, only a single diode, e.g. 86A, is required in each of diode groups 78A—78P to energize the single line corresponding to the correct answer for the encoded problem and test numbers.

To extract the correct answer for a test having a given number of choices per problem, the output signals from problem answering matrix 77 are fed to decision matrix 88 wherein the four possible answers as determined by the problem answering matrix are combined with a signal indicative of the number of choices per problem to determine the single correct answer to the problem. The number of choices per problem, as encoded into the answer confirmation system by the hundreds digit of the test number (as previously explained) is applied to the decision matrix from thumbwheel switch 16C over one of four lines 29A—29D dependent upon there being 5, 4, 3 or 2 choices, respectively, per problem.

Decision matrix 88 generally include 14 AND gates 89A—89N each energized by an individual one of lines $A_5$-$E_5$, $A_4$-$D_{4a}$, $A_3$-$C_3$ and $A_2$-$B_2$, in problem answering matrix 77. The second input to each of AND gates 89A—89N is one of lines 29A—29D with line 29A corresponding to five choices per problem energizing AND gates 89J—89N having the $A_5$—$E_5$ lines as the other inputs, line 29B corresponding to four choices per problem energizing AND gates 89F—89I having the $A_4$—$D_4$ lines as the other inputs, line 29C corresponding to three choices per problem energizing AND gates 89C—89E having the $A_3$—$C_3$ lines as the other inputs and line 29D corresponding to two choices per problem energizing AND gates 89A—89B having the $A_2$—$B_2$ lines as the other inputs. Because problem answering matrix 77 provides a single correct answer for each of tests having 5, 4, 3, and 2 choices per problem, only that AND gate of decision matrix 88 energized by both the correct answer and correct number of choices is activated to select the single correct answer corresponding to the problem number being worked.

The outputs from AND gates 89B, 89E, 89I and 89N energized by lines $A_2$, $A_3$, $A_4$ and $A_5$ of problem answering matrix 77 are joined and connected as a voltage input to gating circuit 91A disposed in series circuit with voltage source 92, lamp 93A and ground. Thus upon the generation of an output voltage from any of AND gates 89B, 89E, 89I and 89N with switch 94 in a closed position, gating circuit 91A is turned on to illuminate lamp 93A indicating A as being a correct answer to the encoded problem. Similarly, the outputs from AND gates 89A, 89D, 89H and 89M energized by lines $B_2$, $B_3$, $B_4$ and $B_5$ of problem answering matrix 87 are connected to gating circuit 91B to permit illumination of lamp 93B upon simultaneous energization of any one of AND gates 89A, 89D, 89H and 89M by problem answering matrix 77 and lines 29A—29D. In a like manner, the output signals from AND gates 89C, 89G, and 89L energized by lines $C_3$, $C_4$ and $C_5$ serve to turn on gating circuit 91C upon simultaneous energization of any one of the respective AND gates by problem answering matrix 77 and lines 29A—29D to illuminate lamp 93C indicating C as a correct answer while gating circuit 91D in series with lamp 93D is closed upon the simultaneous energization of the dual inputs to any one of AND gates 89F and 89K and gating circuit 91E in series with lamp 93E is closed only upon simultaneous energization of lines 29A and $E_5$.

To prepare specialized test material, the teacher need only close switch 94 to permit illumination of lamps 93A—93E upon energizing of gating circuits 91A—91E. The test number then is encoded in thumbwheel switch 16 and as the problem number is advanced, a visual readout of the answer sequence is produced by the answer confirmation system. The multiple choice answers for each problem then are arranged by the teacher to position the correct answer for each problem at the answer location for the problem as determined by the answer confirmation system. When tests specially prepared for utilization with the answer confirmation system are employed, the correct answer is positioned properly for each problem of a given test number and decision matrix 88 is not required.

A matrix 96 similar to decision matrix 88 serves to correlate the answer chosen by the student with the correct answer as determined by the automatic answer confirmation system to immediately indicate the correctness of the chosen answer. Matrix 96 includes 14 AND gates 97A—97N each connected to an individual one of output lines $A_5$—$E_5$, $A_4$—$D_4$, $A_3$—$C_3$ and $A_2$—$B_2$ of problem answering matrix 77. To permit selection of the single correct answer for each problem in a manner identical to the operation of AND gates 89A—89N, line 29A corresponding to five choices per problem is connected as a second input to each of AND gates 97J—97N energized by lines $A_5$—$E_5$, line 29B corresponding to 4 choices per problem is connected to a second input to the four AND gates 97F—97I energized by lines $A_4$—$D_4$, line 29C corresponding to 3 choices per problem is connected to a second input to the three AND gates energized by lines $A_3$—$C_3$ and line 29D corresponding to 2 choices per problem is connected as a second input to the two AND gates 97A and 97B energized by lines $A_2$ and $B_2$. Each of AND gates 97A—97N also has a third input energized by one of the student pushbuttons 98A—98E corresponding to the line from the problem answering matrix connected to the AND gate. Thus the output signal from pushbutton 98A corresponding to an A answer selection by the student is connected to AND gates 97B, 97E, 97I, and 97N which gates also are energized by lines $A_2$, $A_3$, $A_4$ and $A_5$, e.g. those lines designated as A answer lines for tests having 2, 3, 4 and 5 choices per problem. Similarly pushbutton 98B is connected to AND gates 97A, 97D, 97H and 97M energized by lines $B_2$, $B_3$, $B_4$ and $B_5$ of problem answering matrix 77 while pushbutton 98C is connected to AND gates 97C, 97G and 97L energized by lines $C_3$, $C_4$ and $C_5$ of problem answering matrix 77, pushbutton 98D is connected to AND gates 97F and 97K energized by lines $D_4$ and $D_5$, and pushbutton 98E is connected to AND gate 97J energized by line $E_5$. The outputs of gates 97A—97N are joined and fed to gating circuit 99 controlling current flow through lamp 101 from voltage source 102 to ground. Thus operation of any one of AND gates 97A—97N by simultaneous energization of the three input leads to the AND gate, i.e. the lead from problem answering matrix 77 giving the correct answer for four possible tests, the lead from thumbwheel switch 16C selecting the single correct answer to the problem and the lead from the student pushbuttons indicating the students choice as the correct answer, turns on gating circuit 99 to illuminate lamp 101 indicating the correctness of the student's response.

The voltage at point 103 is sensed and fed to a pulse forming circuit 104 to generate an output signal from the pulse forming circuit upon each triggering of gating circuit 99 by a correct student response. The output signals from the pulse forming circuit are summed by digital counter 105 thereby totaling the number of correct responses offered by the student.

To record the total number of answers proposed by the student, the outputs from pushbuttons 98A—98E are connected to a second digital counter 106 over line 107 to advance the counter one count upon each depression of any pushbutton. Each output signal from pushbuttons 98A—98E on line 107 also applied as a triggering input to gating circuit 108 in series circuit with incorrect lamp 109, voltage source 110 and ground tending to illuminate incorrect lamp 109 upon each depression of pushbuttons 98A—98E. To inhibit an illumination of incorrect lamp 109 when a correct answer is given, the output signal from pulse forming circuit 104 is fed as a gating signal to transistor 112 connected in parallel across gating circuit 108 to bypass the energizing signal from the gating circuit when a correct answer signal is fed to digital counter 105. Thus, when the automatic answer confirmation system indicates B as the correct answer corresponding to the problem number and test number being worked, a closure of pushbutton 98B generates an output signal from matrix 96 energizing correct lamp 101 and gating transistor 112 to a conductive state bypassing to ground the energizing pulse for gating circuit 108. If an incorrect answer is given, e.g. pushbutton 98C is depressed, no output signal is obtained from matrix 96 and voltage source 113 is applied through pushbutton 106C and lead 107 to trigger gating circuit 108 illuminating incorrect lamp 109.

The input signal to digital counter 106 also is applied to NAND gate 114 through switch 115 and lead 116 to automatically advance the encoded problem number one digit upon each depression of any one of pushbuttons 98A—98E. When automatic advancement of the problem number is desired only upon the submission of a correct answer to the problem being worked, switch 115 is thrown in an upward position to energize NAND gate 114 only upon the generation of an output pulse from pulse forming circuit 104.

If only the automatic mode of operation is desired, switch 35 is thrown to a downward position to ground input terminals 42 and 63 of NAND gates 41 and 62, respectively, thereby inhibiting advancement of the problem number by depression of pushbuttons 40A—40B. Thus advancement to a succeeding problem number is achieved with each depression of pushbuttons 98A—98E with switch 115 in a downward position (as shown) or by the depression of the pushbutton corresponding to the correct answer with switch 115 in an upward position. When automatic advancement of the problem number is not desired, switch 35 is thrown in an upward position to continuously ground one input to NAND gate 114. The subsequent application of a true pulse on lead 116 to NAND gate 114 therefore is ineffective to automatically advance the problem number one decimal digit. Thus advancement of the units or tens digit is achieved only by depression of pushbuttons 40A and 40B, respectively, with switch 35 in an upward position.

Although this invention has been specifically described for student response systems, the invention also could be employed in other types of confirmation systems, e.g. credit card confirmation systems wherein numbers on a credit card are automatically combined to produce an indicator for comparison with information separately introduced by the credit card holder.

What I claim: as new and desire to secure by Letters Patent of the United Statesis:

1. An automatic answer confirmation system comprising means for encoding the problem designator and test designator of a multiple choice test into said confirmation system as coded logic numbers having a plurality of binary digits, logic means for reducing the number of binary digits of said coded logic numbers to produce an answer select logic number corresponding to said problem designators, said logic means providing an equal probability for one of two conditions in each digit of said answer select logic number and producing an irregular sequence of answer select logic numbers for successive problem designators, matrix means for converting said answer select logic number to the correct answer corresponding to the problem identified by said designator and means for correlating said correct answer as determined from said matrix means with the choice selected for the problem identified by the encoded designator.

2. An automatic confirmation system comprising means for encoding at least two designator numbers into said confirmation system as binary coded numbers, means for logically combining said binary coded numbers to form a composite number having a reduced number of binary digits relative to the total number of digits of said binary coded designator numbers, said combining means providing an irregular answer sequence for successive designator numbers, logic means for converting said composite number to a single indicator corresponding to said designator digits, means for externally introducing information relative to said designator digits and means for comparing said introduced information with said single indicator determined from said designator digits for determining the correctness of said introduced information.

3. An automatic confirmation system according to claim 2 wherein said binary coded designator digits are combined in logic circuitry producing an equal probability for one of two conditions in each digit of said composite number.

4. An automatic confirmation system according to claim 3 further including means for reading out the irregular answer sequence from said confirmation system for successive designator numbers.

5. An automatic answer confirmation system for a multiple choice test comprising means for encoding into said answer confirmation system designators corresponding to the problem and test being answered, means for converting each designator into binary numbers having a plurality of digits coded to produce an equal division between ones and zeros in each column of binary digits from zero to nine, means for mixing at least a portion of the binary number corresponding to the problem with at least a portion of said binary number corresponding to the test to produce a composite binary number, said mixing means producing an irregular sequence of composite binary numbers for consecutive problem numbers with each problem designator consistently producing a constant composite binary number for a given test designator, matrix means for decoding said composite number obtained from said problem and test designators to produce the correct answer for the problem being worked, means for introducing an operator selected choice into said system and means for comparing said correct answer as determined from said matrix means with said operator selected choice.

6. An automatic answer confirmation system according to claim 5 wherein said mixing means include means for logically combining said problem and said test designators in a logic circuit employing exclusive-OR gates to produce a composite binary number.

7. An automatic answer confirmation system according to claim 6 wherein the digits of said composite binary number from said logic circuit are summed in a second logic circuit employing exclusive-OR gates to reduce the number of binary digits corresponding to given problems and test designators.